United States Patent
Baum

(10) Patent No.: US 7,318,023 B2
(45) Date of Patent: Jan. 8, 2008

(54) METHOD FOR DETECTING THE QUANTIZATION OF SPECTRA

(75) Inventor: Peter Georg Baum, Hannover (DE)

(73) Assignee: Thomson Licensing, Boulogne Billancourt (FR)

(*) Notice: Subject to any disclaimer, the term of this patent is extended or adjusted under 35 U.S.C. 154(b) by 642 days.

(21) Appl. No.: 10/497,734

(22) PCT Filed: Nov. 23, 2002

(86) PCT No.: PCT/EP02/13188

§ 371 (c)(1),
(2), (4) Date: Jun. 4, 2004

(87) PCT Pub. No.: WO03/049306

PCT Pub. Date: Jun. 12, 2003

(65) Prior Publication Data

US 2005/0015241 A1    Jan. 20, 2005

(30) Foreign Application Priority Data

Dec. 6, 2001    (EP) .................................. 01250431

(51) Int. Cl.
*G10L 19/02* (2006.01)
*G10L 21/06* (2006.01)
*H04B 1/66* (2006.01)

(52) U.S. Cl. .................. 704/206; 704/230; 704/501
(58) Field of Classification Search ............. 704/200.1, 704/205, 206, 230, 500, 501; 341/200
See application file for complete search history.

(56) References Cited

U.S. PATENT DOCUMENTS

| 5,535,300 | A | * | 7/1996 | Hall et al. | 704/227 |
| 6,101,475 | A | * | 8/2000 | Keyhl et al. | 704/503 |
| 6,370,502 | B1 | * | 4/2002 | Wu et al. | 704/230 |
| 6,529,866 | B1 | * | 3/2003 | Cope et al. | 704/205 |
| 2001/0047256 | A1 | | 11/2001 | Tsunushima et al. | |

FOREIGN PATENT DOCUMENTS

| EP | 0309974 | 4/1989 |
| EP | 0702458 | 3/1996 |

OTHER PUBLICATIONS

Herre et al., "Analysis of Decompressed Audio—The 'Inverse Decoder'", 109th Convention of the Audio Engineering Society, Sep. 22-25, 2000, pp. 1 to 23.*
Keyhl et al., "The effect of low bit-rate coding upon impaired audio material", International Broadcasting Convention, 1995, IBC 95, Sep. 14-18, 1995, pp. 151 to 158.*
Search Report Dated Mar. 10, 2003.

* cited by examiner

*Primary Examiner*—Martin Lerner
(74) *Attorney, Agent, or Firm*—Joseph J Laks; Paul P. Kiel

(57) ABSTRACT

The invention comprises the retrieval of a quantized spectrum of audio-data, which had been compressed conforming to psychoacoustic principles. This spectrum can be identified with the aid of sorted (and logarithmized) differences of the magnitude of the amplitude. A problem to be solved by the invention is to find the basis of sensitive indicators for the degree of quantization of a spectrum. The result of this calculation shows for a quantized spectrum several small values at amplitudes of the same quantization level, and obvious spikes at positions, where the amplitudes have reached a higher level of quantization, while a non-quantized spectrum typically resembles noise.

3 Claims, 4 Drawing Sheets

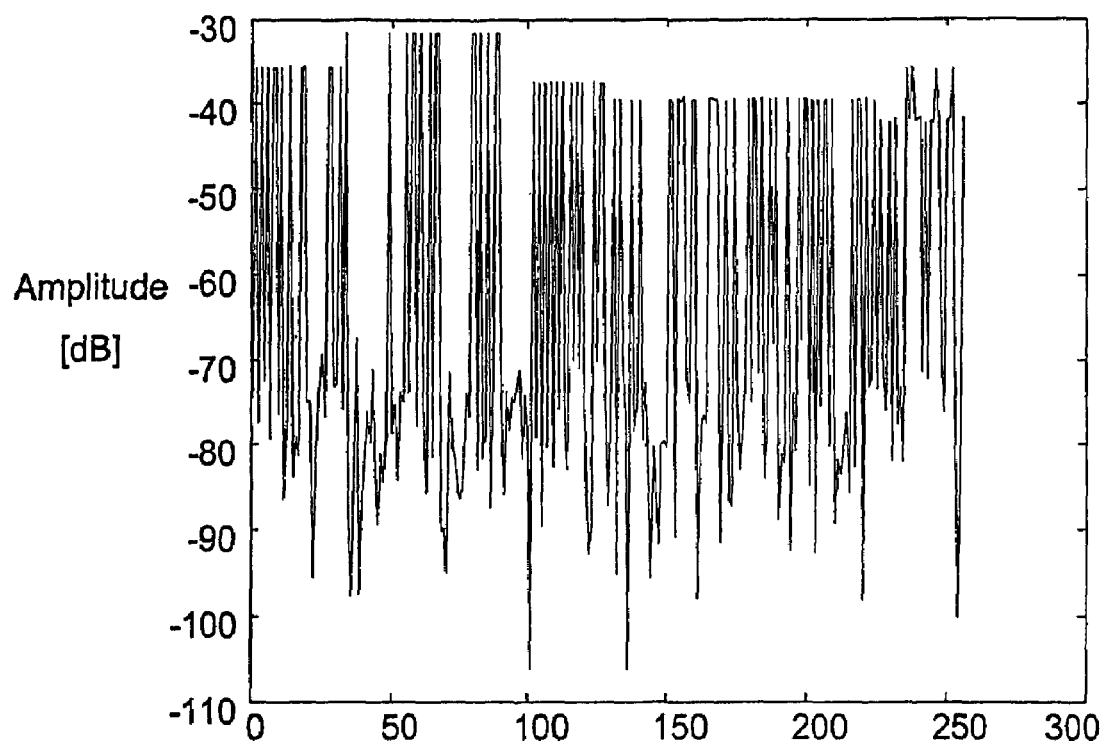
Fig. 1: Spectrum (quantized)
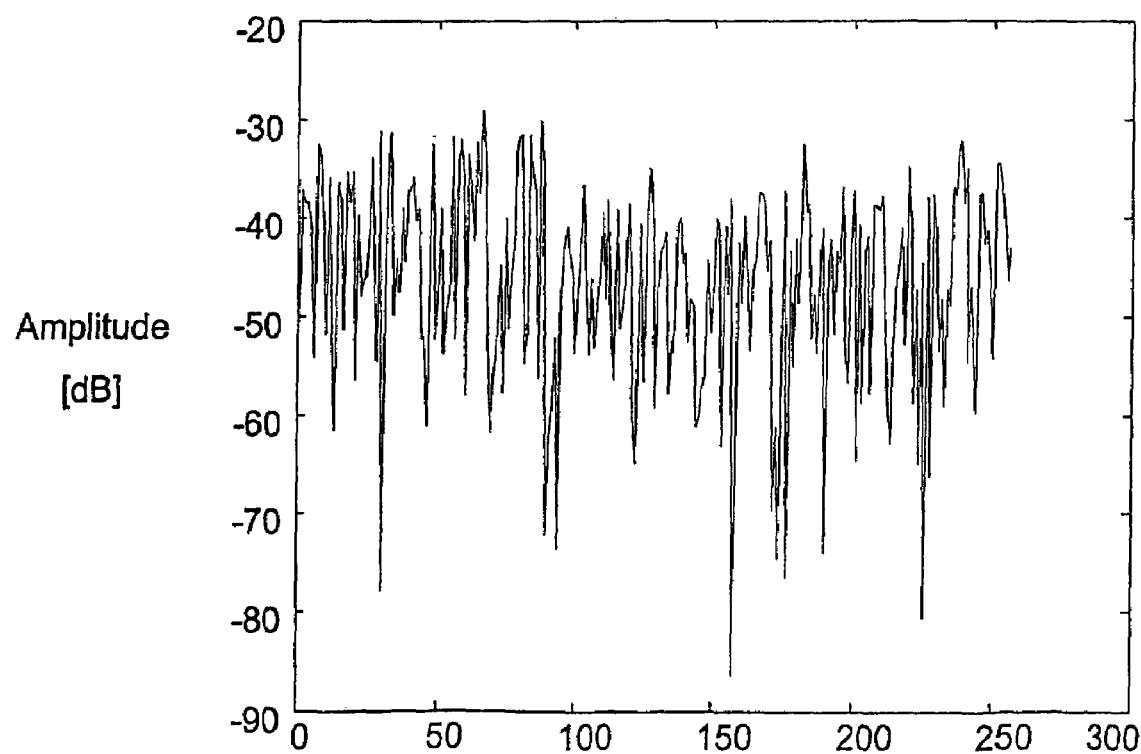
Fig. 2: Spectrum (non-quantized)

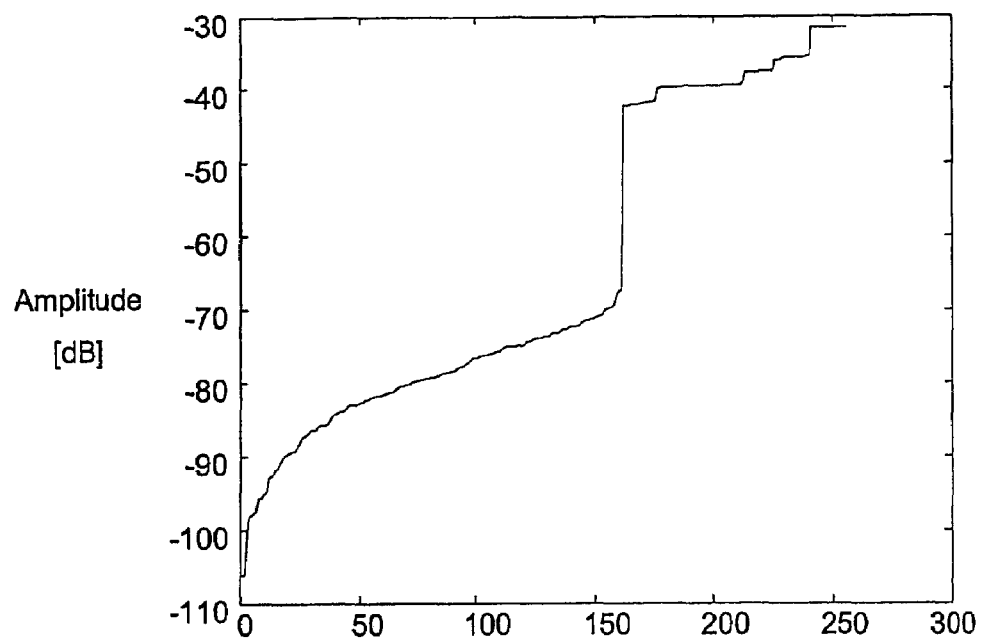
Fig. 3: Sorted Spectrum (quantized)
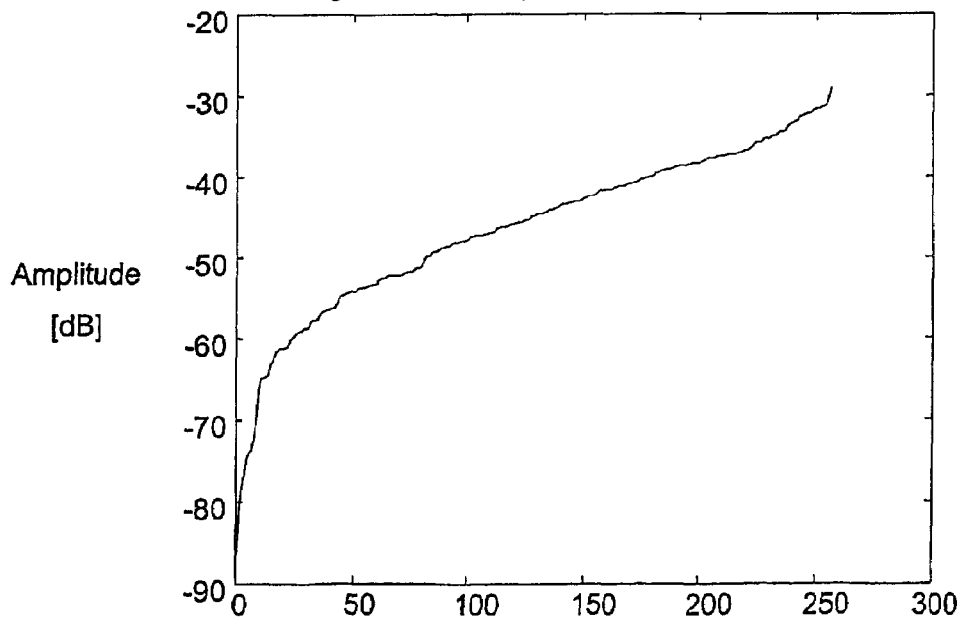
Fig. 4: Sorted Spectrum (non-quantized)

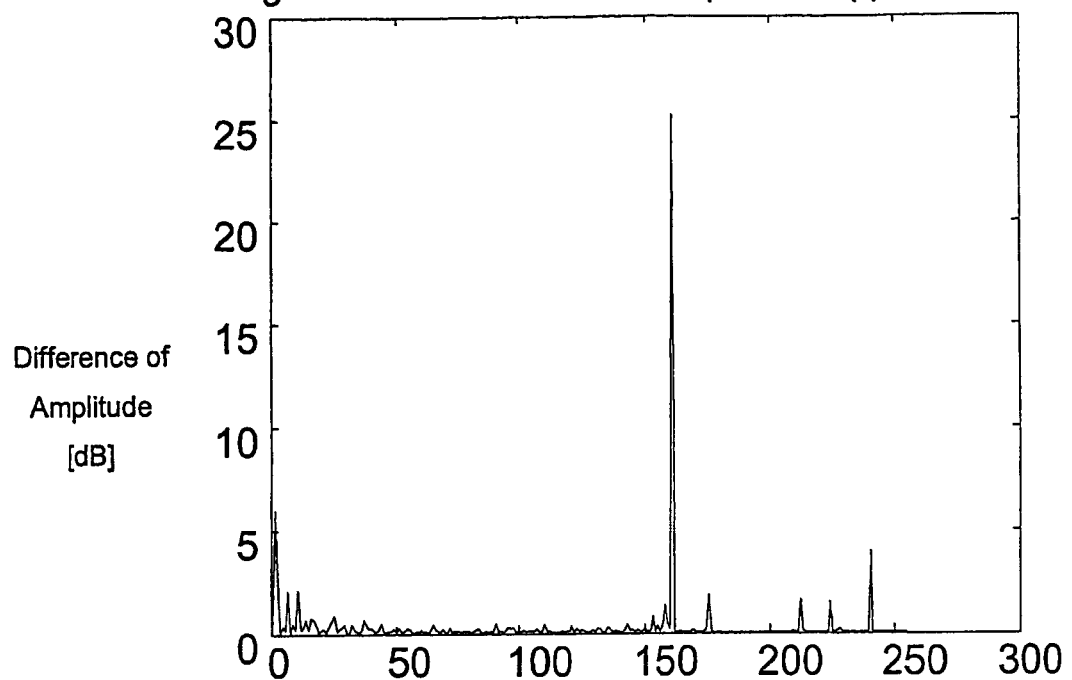
Fig. 5: Differentiated Sorted Spectrum (quantized)
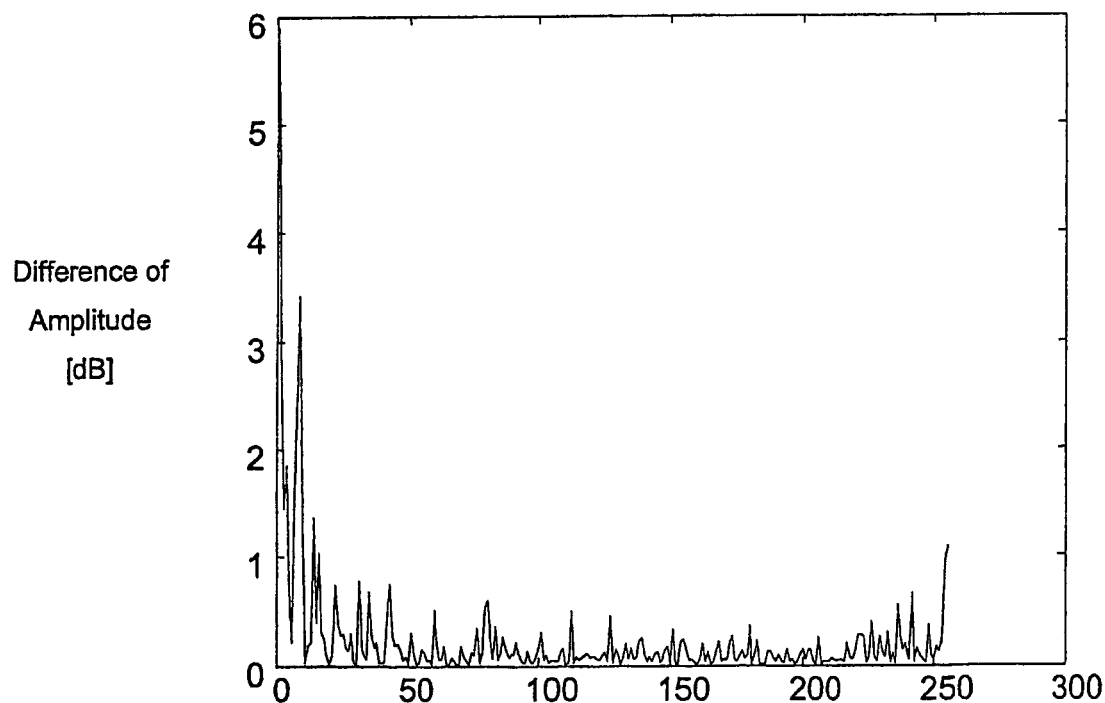
Fig. 6: Differentiated Sorted Spectrum (non-quantized)

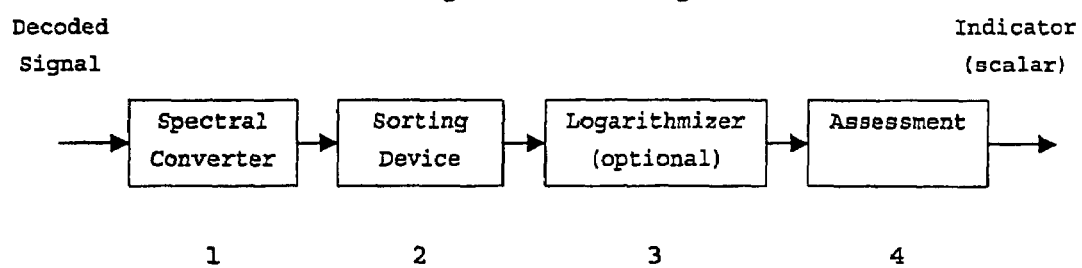
Fig. 7 Block Diagram

METHOD FOR DETECTING THE QUANTIZATION OF SPECTRA

This application claims the benefit, under 35 U.S.C. § 365 of International Application PCT/EP02/13188, filed Nov. 23, 2002, which was published in accordance with PCT Article 21(2) on Jun. 12, 2003 in English and which claims the benefit of European patent application No. 01250431.2, filed Dec. 6, 2001.

BACKGROUND

Audio-data are being transmitted in a compressed way conforming to psychoacoustic principles and decoded by the receiver. Re-compressing of these decoded data conforming to psychoacoustic principles will lead to loss of quality. This loss can be omitted, if the parameters of the original compression can be detected and re-used, see e.g. EP-A-0746913.

A method for the detection of these parameters for codecs which use spectra, is testwise calculation of spectra with different parameters. If the parameters of analysis (start of transformation, window type, length of spectrum) match the codec parameters, the spectrum has a quantized appearance. Because of calculation impreciseness or different calculation precision of the codec and of the analysis calculation, the quantized spectrum will look slightly noisy, i.e. the amplitudes of the same level of quantization will NOT have the same magnitude.

The difficulty is to distinguish, whether a spectrum has a "quantized character", so that different parameters of the spectrum can be analyzed concerning their impact on the quantization of the spectrum.

Because compression goes along with a vanishing of certain lines of the spectrum (cf. in Herre, Jürgen; Michael Schug: Analysis of Decompressed Audio—The "Inverse Decoder", 109th AES Convention, Los Angeles 2000) those spectral lines are being counted, which are smaller than a threshold value.

INVENTION

The invention comprises the retrieval of a quantized spectrum of audio-data, which had been compressed conforming to psychoacoustic principles. This spectrum can be identified with the aid of sorted (and logarithmized) differences of the magnitude of the amplitude.

A problem to be solved by the invention is to find the basis of sensitive indicators for the degree of quantization of a spectrum. The result for a quantized spectrum shows several small values at amplitudes of the same quantization level, and obvious spikes at positions, where the amplitudes have reached a higher level of quantization, while a non-quantized spectrum typically resembles noise.

This problem is solved by the method disclosed in claim 1.

In principle, the inventive method is suited for tandem codecs (decoding-encoding). The invention can also be used at the procedure of reverse engineering with unknown codecs.

Advantageous additional embodiments of the invention are disclosed in the respective dependent claims.

DRAWINGS

Exemplary embodiments of the invention are described with reference to the accompanying drawings, which show in:

FIG. 1 Magnitudes of a quantized spectrum of a decoded audio signal;
FIG. 2 Magnitudes of a non-quantized spectrum;
FIG. 3 Amplitudes of FIG. 1) sorted;
FIG. 4 Amplitudes of FIG. 2) sorted;
FIG. 5 Differentiated sorted spectrum from FIG. 3);
FIG. 6 Differentiated sorted spectrum from FIG. 4);
FIG. 7 Simple block diagram of the detector.

EXEMPLARY EMBODIMENTS

FIG. 1 shows the magnitudes of a quantized spectrum of a decoded signal. The parameters of analysis (start of the transformation, window type, length of spectrum) match the codec parameters, therefore the spectrum has a quantized appearance.

In comparison to FIG. 1, FIG. 2 shows the magnitudes of a non-quantized spectrum. Thus, the parameters do not match the codec parameters.

FIG. 3 shows the sorted amplitudes from FIG. 1, while FIG. 4 shows the sorted amplitudes of a non-quantized spectrum from FIG. 2.

FIG. 5 shows the differentiated sorted spectrum from FIG. 3, while FIG. 6 shows the differentiated sorted spectrum of a non-quantized spectrum from FIG. 4

The comparison of FIGS. 5 and 6 will clearly show the difference between a quantized spectrum (FIG. 5) and a non-quantized spectrum (FIG. 6).

The next step is to calculate a scalar out of these spectra, which will be used as an indicator for the quantization.

The invention can be used in connection with an inverse encoder. Often an encoded and decoded audio signal has to be encoded for another transmission a second time. If the encoder parameters in the second encoder are the same as in the first, codec artifacts can be minimized. The inverse encoder tries to retrieve these parameters. In this case, for it has to be decided, if a spectrum looks quantized, which can be done with the help of the invention.

Another use of the inverse encoder and consequently also of the invention is in reengineering codecs for proving infringements in the area of intellectual properties.

FIG. 7 shows a simple block diagram of the invention. The purpose of the invention is to convert time domain samples in frequency domain via spectral converter 1, then sorting the amplitudes in frequency domain via sorting device 2, followed by an optional logarithmizing of these sorted amplitudes, via logarithmizer 3, and finally assessment of sorted spectra values via assessment element 4, e.g. differentiation and detection of first peak.

The invention claimed is:
1. Method of detecting the quantisation of spectra of a decoded audio signal in order to detect or retrieve encoding parameters that were used in the encoding of said audio signal, said method including the steps:
converting samples of the decoded audio signal into frequency domain, thereby using the test parameters start position of transformation, window type, length of spectrum;
in the frequency domain, sorting the magnitudes of the spectral values;
differentiating the sorted spectral magnitude values;

assessing for a given set of test parameters whether the sorted spectral values have a quantised appearance, using the position and/or height of a first peak in said differentiation.

2. Method according to claim 1, wherein the spectral values are logarithmised (3) before said assessing step.

3. Apparatus for detecting the quantisation of spectra of a decoded audio signal in order to detect or retrieve encoding parameters that were used in the encoding of said audio signal, said apparatus including:

means for converting samples of the decoded audio signal into frequency domain, thereby using the test parameters start position of transformation, window type, length of spectrum;

means for sorting, in the frequency domain, the magnitudes of the spectral values and for a differentiating the sorted spectral magnitude values;

means for assessing for a given set of test parameters whether the sorted spectral values have a quantised appearance thereby using the position and/or height of a first peak in said differentiation.

* * * * *